United States Patent [19]

Ward et al.

[11] 4,013,493
[45] Mar. 22, 1977

[54] PROCESS FOR ETCHING GLASS OR CERAMIC SURFACE

[75] Inventors: Truman L. Ward; Ruth R. Benerito, both of New Orleans; Jacques J. Hebert, Metairie, all of La.

[73] Assignee: The United States of America as represented by the Secretary of Agriculture, Washington, D.C.

[22] Filed: Sept. 8, 1975

[21] Appl. No.: 611,371

Related U.S. Application Data

[62] Division of Ser. No. 499,689, Aug. 22, 1974, Pat. No. 3,926,709.

[52] U.S. Cl. .................................. 156/654; 65/31; 156/663
[51] Int. Cl.$^2$ .................................. C03C 15/00
[58] Field of Search ............... 156/4, 8, 16, 15, 24, 156/25, 7; 65/31

[56] References Cited
UNITED STATES PATENTS

| 276,896 | 5/1883 | Schulze-Berge | 156/89 |
| 1,306,505 | 6/1919 | Ueda | 156/4 |

*Primary Examiner*—William A. Powell
*Attorney, Agent, or Firm*—M. Howard Silverstein; Salvador J. Cangemi; David G. McConnell

[57] ABSTRACT

Glasslike materials have been produced by heating plumbite-treated cellulosics in a limited oxygen atmosphere while in contact with a glass or ceramic surface. Cotton-lace, knits, and other designs of cellulosic materials can be applied to glass or ceramic surfaces by process of this invention. Glass or ceramic materials have been joined together to form a strong bond by placing a piece of the plumbite-treated cellulosic material between the glasses and heating the assembly in a limited oxygen atmosphere. Etching of glass has also been achieved by process of this invention.

1 Claim, No Drawings

PROCESS FOR ETCHING GLASS OR CERAMIC SURFACE

This is a division of application Ser. No. 499,689, filed Aug. 22, 1974 now U.S. Pat. No. 3,926,709.

This application is related to applications Ser. No. 611,370 and 611,372, filed Sept. 8, 1975, and are divisions of Ser. No. 499,689, filed Aug. 22, 1974, now U.S. Pat. No. 3,926,709, issued Dec. 16, 1975.

This invention relates to a glasslike substance, or group of substances, produced from the reaction of plumbite-treated cellulose, and a glass surface. A reaction occurs between the plumbite-treated cellulose and the glass or ceramic surface upon heating in a limited oxygen atmosphere. Glass flakes, artistic designs, etchings, and adherances can be achieved by the processes of the present invention.

One object of this invention is to provide a glass-to-glass or glass-to-ceramic bonding process.

A second object of this invention is to provide a means of etching glass.

A third object of this invention is to provide a means of imparting artistic lacework designs to glass and ceramic surfaces.

A fourth object of this invention is to provide a means of producing glasslike materials which are hard, resistant to alkalis and mineral acids, and which will withstand oven temperatures.

A fifth object of this invention is to provide a glasslike surface which can be written upon using an ordinary lead pencil and the writing erased using an ordinary rubber eraser.

BACKGROUND AND PRIOR ART OF THE INVENTION

In the investigative work of the use of polyvalent Group IV metallic ions as tags for identifying reactive sites of cotton it was learned that the most reactive ion was plumbite which added up to 40% by weight of Pb, as compared to 5% or less for other metals. It was further learned that placing the plumbite-treated cotton sample in a glass dish and heating in an oven at about 600° C., for about 1 hour, produced a glasslike material. It was unexpectedly discovered that the similarity to the work with other ions had ceased. Although the treated cotton fabric retained its structual integrity the treated fabric when removed from the oven exhibited a glassy appearance. It was found to be harder than soft glass or stainless steel. The surface smoothness and adherence to the glass dish depended on the percent of plumbite in the cotton intermediate. Low plumbite contents, say 5% to 15%, caused firm adhesion and a less smooth than with plumbite contents above 15%.

Further investigative work indicated that to form the new glassy material the plumbite-treated fabric intermediate needs to be in contact with a high silicon content surface when heated. It was also learned that the heating needs to take place in an atmosphere with limited oxygen present. An essential part of the process is that the high-silicon surface and the oven be at a temperature below 200° C. when placed in contact with the treated fabric. Higher temperatures burn the fabric and destroy the process. The glassy material thus produced resists acids and alkalis. It was also learned that this treatment can be adjusted by using a low plumbite content in the intermediate to produce a surface upon which identification markings can be made with a lead pencil. The markings can be removed by erasure with a rubber eraser. It was also found that the adhesive property can be used to form a glasslike weld between glasses and/or ceramic articles. Of particular interest was the welding of unlike glasses, such as soft and hard glass or porcelain and hard glass by the process of this invention. Such welds are difficult to achieve by use of prior art.

It was further found by investigation that cellulosic materials other than cotton can be used provided hydroxyl groups are available for adding the plumbite ion. It was also found that powdered cellulosic material may be used. It was further established that neither lead monoxide alone nor lead monoxide admixed either with the cellulosic material or with carbon will produce the glasslike material described as the product of this invention.

Prior art processes are known for adding a glaze to ceramic objects by applying a metal oxide paste or paint and prior art processes are known for treating materials with sodium plumbite.

In contrast to the prior art, this invention relates to a process whereby the metallic ion is reacted with a cellulosic material to produce a stable intermediate. This intermediate is essential to the process of this invention and is preferably used as a fabric or other fibrous material although it can be used as powder. It is this intermediate that when heated in contact with a surface containing silicon produces the glasslike material. In contrast to the glaze of the prior art the glass-like material of this invention reveals the structure and texture of the intermediate, which has become transparent or translucent. In contrast to the glaze of prior art this material contains carbon indicating the presence of some structural fingerprint of the cellulosic intermediate material.

The literature discloses that R. C. Griffin (Technical Methods of Analysis, McGraw Hill, Inc., N.Y. (1927) had a method of preparing sodium plumbite solutions at 26° C. without constant shaking. Griffin does not specify an exact time for the contact between the lead monoxide and a sodium hydroxide solution prior to filtering. He does suggest that at least 24 hours be observed, with occasional shaking.

The revelations of Griffin were scrutinized and used as a basis for further investigative work. A full report of this investigative work by the instant inventors appears in Textile Research Journal, pp. 12–21, January 1974, the article bearing the title "Addition of Lead from Sodium Plumbite Solution to Modified and Unmodified Cottons". It should be pointed out that although sodium hydroxide is used because of its availability, in the preparation of the plumbite solutions of this invention, other suitable alkali metal hydroxides would be expected to yield similar results.

GENERAL ASPECTS OF THE PRESENT INVENTION

In general, the present invention can best be described as being a plurality of glasslike products and the processes correlated in the reaction of sodium plumbite with a cellulosic textile or other polysaccharide and the contact of that modified polysaccharide intermediate with a silicate, such as glass or ceramic and then heating in a scarcity of oxygen to temperatures about from 500° to 800° C., for at least about 60 minutes, to obtain a rigid glassy substance, which can be controllably transparent or transluscent, as desired.

The cellulose or other polysaccharide is modified by reacting it with an aqueous solution of sodium plumbite prepared according to the method of Griffin. After treatment of the cellulosic material with the sodium plumbite solution, the product is thoroughly washed with water and dried. The percentage of plumbite added to the cellulosic material may be controlled by varying the length of time the cellulosic material is in contact with the sodium plumbite in solution.

The following Examples are provided to illustrate the preferred embodiments of the present invention and are not to be construed as limiting the invention in any manner whatsoever.

EXAMPLE 1

A quantity of 80 × 80 cotton printcloth was soaked in sodium plumbite solution prepared according to the method of Griffin so that the final fabric had a 12% lead content by analysis. The preparation comprised a 1 hour treatment. The fabric was washed with water until neutral to litmus. Pieces of the fabric intermediate were placed on samples of soft soda lime glass, porcelain, Pyrex glass, and Vycor glass. The assembly of fabric on glass was placed in a closed furnace at room temperature (26° C.) and heated to 700° C. The fabric was glasslike and translucent after about 1 hour at 700° C. The oven door was opened, the oven power was shut off and the samples cooled in the opened oven until the oven thermometer read 200° C. after which the samples were removed and cooling completed outside the oven. The newly formed product was analyzed by photoelectron emission spectroscopy and found to contain the elements silicon, oxygen, carbon, and lead. The newly formed product was harder than stainless steel and soft glass but softer than carbide or diamond. It resisted etching by 50% NaOH or concentrated nitric acid for over 24 hours.

EXAMPLE 2

The procedure and quantities of Example 1 were duplicated except for the temperature of the oven. The temperature of the oven was adjusted to a minimum of 500° C., using 6 hours to accomplish the change to a glasslike material. The maximum useable temperature was found to be the distortion temperature of the glass or ceramic fabric holder (600° was the temperature that was useable for some soft glass, and 1200° was the maximum useable temperature for porcelain). The glasslike products were like those of Example 1.

EXAMPLE 3

The procedure and quantities of Example 1 were duplicated except that the lead content of the plumbite-treaated cotton fabric intermediate was varied. Plumbite-treated cotton fabric intermediates with lead contents ranging from about 5% to 37% were used. The intermediates all turned glasslike and were hard and alkali and acid resistant. Products made from intermediates with lead contents ranging from about 5% to about 15% were more translucent and could be written on with a lead pencil. The writing could be erased with a pencil eraser. Any shape or design of the fabric was maintained in the product and the product adhered firmly to the glass or ceramic on which it was made. Products made using intermediates with lead contents over 15% were also hard and resistant to the same chemicals but were smoother of surface, more transparent, and separated from the glass or ceramic surface on which they were made.

EXAMPLE 4

Plumbite-treated cotton fabrics with lead contents ranging from 5% to 37% were used to join pieces of soft glass, Pyrex glass, Vycor glass, and porcelain in all of the possible combinations of these materials. The two pieces to be joined were separated at the point of juncture by a layer of the plumbite-treated fabric intermediate. This assembly was placed in the oven and the temperature raised to about 700° C. and held there for about 1 hour. The assembly was cooled to near room temperature prior to removal from the oven. Intermediate fabrics with lead contents ranging from about 8% to about 40% all produced strong glasslike bonds to all glassy materials tested.

EXAMPLE 5

The procedure and quantities of Example 3 were duplicated except that the cellulosic material employed in place of unmodified cotton was rayon fabric, ramie fabric, cotton fabric which had been modified to contain amine groups, and cotton modified to contain acid groups. All of these added lead from the plumbite solution to form the intermediate and formed glasslike final products during the heating part of the process, as in Example 3.

EXAMPLE 6

The procedure of Example 4 was employed except that the fabric intermediate was ground up prior to use to form a bond between the glass or ceramic materials. Good bonds formed by using the powdered intermediate.

EXAMPLE 7

The procedure and quantities of Example 1 were again employed except that powdered cellulose was used as the starting material in place of the 80 × 80 cotton printcloth. The product obtained was glasslike, hard, and chemically resistant but had no fabric weave-pattern.

EXAMPLE 8

The procedure of Example 1 was duplicated except that the plumbite-treated cotton fabric intermediate had a 37% lead content. The resultant glasslike product separated from the glass holder, leaving an etched surface on the glass holder, bearing the same shape and pattern weave as the fabric intermediate. Fabrics with lead contents of about 25% to 37% performed in this manner to etch the glass.

EXAMPLE 9

The procedure and quantities of Example 1 were duplicated except that the cotton printcloth was substituted by cotton lace, cotton felt, cotton duck, cotton matt, and paper in sheet form. All of these compared favorably with the results obtained for cotton printcloth.

We claim:
1. A process for etching a glass or ceramic surface, the process comprising placing an appropriately shaped or cut piece of sodium plumbite treated cellulosic textile containing about at least 25% lead, flat against the surface of glass or ceramic; heating the assembly in a closed heating chamber for about 60 minutes at temperatures of about from 600° to 700° C.; the chamber and contents being cooled gradually to avoid fracture of the original glass or ceramic surface; and peeling off the newly formed glasslike product to reveal an etched area that is identical to the shape and relief of the original cellulosic textile.

* * * * *